United States Patent [19]

Wuthrich

[11] Patent Number: 4,700,091
[45] Date of Patent: Oct. 13, 1987

[54] BIPOLAR STEPPING MOTOR ROTOR WITH DRIVE PINION AND METHOD OF MANUFACTURE

[75] Inventor: Paul Wuthrich, Watertown, Conn.

[73] Assignee: Timex Corporation, Waterbury, Conn.

[21] Appl. No.: 899,271

[22] Filed: Aug. 22, 1986

[51] Int. Cl.[4] ............................................. H02K 37/00
[52] U.S. Cl. .................................... 310/49 R; 310/43; 310/156
[58] Field of Search ................ 310/40, 40 MM, 42 R, 310/156, 43, 83; 368/88, 104

[56] References Cited

U.S. PATENT DOCUMENTS

| | | | |
|---|---|---|---|
| 3,320,822 | 5/1967 | Tatom | 310/49 R |
| 3,969,642 | 7/1976 | Yoshino | 310/49 R |
| 4,084,403 | 4/1978 | Kitai | 368/204 |
| 4,206,379 | 6/1980 | Onda | 310/43 |
| 4,250,421 | 2/1981 | Masuda | 310/49 R |
| 4,270,066 | 5/1981 | Terade | 310/40 MM |
| 4,376,996 | 3/1983 | Wuthrich | 368/221 |
| 4,483,627 | 11/1984 | Muller | 368/88 |
| 4,571,516 | 2/1986 | Schneiter | 310/156 |
| 4,647,218 | 3/1987 | Wuthrich | 368/157 |

FOREIGN PATENT DOCUMENTS

WO09/00930 11/1979 PCT Int'l Appl. ............... 310/49 R

Primary Examiner—R. Skudy
Attorney, Agent, or Firm—William C. Crutcher

[57] ABSTRACT

A wristwatch movement has a Lavet stepping motor directly driving a toothed center wheel by means of a drive pinion which is an integral part of the stepping motor rotor. The rotor comprises a bipolar permanent magnet member and a plastic rotor body molded around the central part of the magnet member to surround it. The rotor body defines a pair of driving pins oriented at a preselected angle with respect to the axis of magnetization. The rotor body also includes journals supporting it for rotation within the stator opening of the stepping motor.

4 Claims, 6 Drawing Figures

BIPOLAR STEPPING MOTOR ROTOR WITH DRIVE PINION AND METHOD OF MANUFACTURE

BACKGROUND OF THE INVENTION

This invention relates generally to wristwatch movements incorporating stepping motors of the Lavet type, which drive the hands of the wristwatch through a gear train. The motor is of the type which receives periodic stepping pulses from a quartz-synchronized integrated circuit. More particularly, the invention relates to the assembly method of manufacture of the bipolar permanent magnet rotor member with drive pinion for the stepping motor.

Wristwatch movements are known which drive a center wheel directly connected to the minute hand by means of a stepping motor rotor acting at the periphery of a wheel connected to the minute hand shaft. By this means, a single reduction gear member can perform the proper reduction to drive an hour hand shaft coaxial with the minute hand shaft. Such an arrangement is shown in U.S. Pat. No. 4,376,996 issued Mar. 15, 1983, in the name of the present inventor and assigned to the present assignee. In a copending application Ser. No. 835,673 filed Apr. 14, 1986, also in the name of the present inventor and assigned to the present assignee, now U.S. Pat. No. 4,647,218 issued Mar. 3, 1987, a timepiece stepping motor of the Lavet-type includes a rotor with a pair of driving pins stepping the rotor 180 degrees once each minute. The pins drive a toothed wheel directly at its periphery which is also connected to the minute hand, so as to step the minute hand once each minute.

Another copending application, Ser. No. 843,020 filed Mar. 24, 1986, now abandoned and filed Dec. 22, 1986 as continuation-in-part application Ser. No. 945,268 in the name of the present inventor and assigned to the present assignee disclosed a two piece stator and frame plate assembly for a stepping motor having a rotor with a pair of driving pins serving as the motor drive pinion.

Constructions are known in which a bipolar permanent magnet serving as the rotor in a two-piece stator of a Lavet stepping motor includes an integral toothed driving pinion, which cooperates with a toothed center wheel for a timepiece. The arresting mechanism for holding the rotor magnet at rest position with respect to the stator between steps is formed by interaction between the ends of the stator poles and the polarity of the permanent magnet rotor.

Another construction, in which a bipolar permanent magnet rotor is provided in a Lavet stepping motor with a one-piece stator is shown in U.S. Pat. No. 4,571,516 issued Feb. 8, 1986. There, a rotor magnet with flat pole ends is inserted into a recess in a plastic rotor body and glued or riveted into place. The magnet has flat ends which interact with flats on the stator opening to determine the stable or rest position.

Known constructions in which the permanent magnet rotor incorporates two driving pins or lugs attached to a central shank passing through the permanent magnet of the stepping motor rotor are shown in U.S. Pat. No. 4,483,627 issued Nov. 20, 1984 and in PCT application No. EP 79/00025 filed Mar. 30, 1979 and published Nov. 15, 1979 under No. WO/9/00930.

If the permanent magnet is round, it is difficult to accurately determine the axis of magnetization which causes the magnet to cooperate with the stator to determine its rest or stable position. This makes it very difficult to provide the proper offset angle between the axis of magnetization and the axis passing through the driving pinion teeth as they make engagement with the toothed wheel.

A better utilization and alignment with the axis of magnetization can be achieved by providing flats on the sides of the permanent magnet as in U.S. Pat. Nos. 3,969,642 and 4,571,516, which also allow the space around the flats to include some plastic material in the case of U.S. Pat. No. 4,571,516. However, this does not solve the problem of properly orienting the axis of magnetization with respect to the axis of engagement passing through the drive pins.

Accordingly, one object of the present invention is to provide an improved bipolar stepping motor rotor with drive pinion which properly orients the pinon with respect to the bipolar permanent magnet.

Another object of the invention is to provide an improved method of manufacture of a bipolar stepping motor rotor with drive pinion.

Still another object of the invention is to provide an improved stepping motor rotor for a Lavet stepping motor directly driving a center wheel.

DRAWINGS

The invention, both as to organization and method of practice, together with other objects and advantages thereof, will be best understood by reference to the following description, taken in connection with the accompanying drawings in which:

FIG. 1 is a top plan view of a wristwatch movement without the hands, dial, or watchcase, FIG. 2 is a bottom plan view of the wristwatch movement, FIG. 3 is a exploded perspective view of the wristwatch movement including also the hands and dial, FIG. 4 is an enlarged plan view of the stepping motor, FIG. 5 is an enlarged perspective view of the rotor and drive pinion, and FIG. 6 is an enlarged schematic plan view illustrating the invention.

DESCRIPTION OF THE PREFERRED EMBODIMENT

Figure 1:
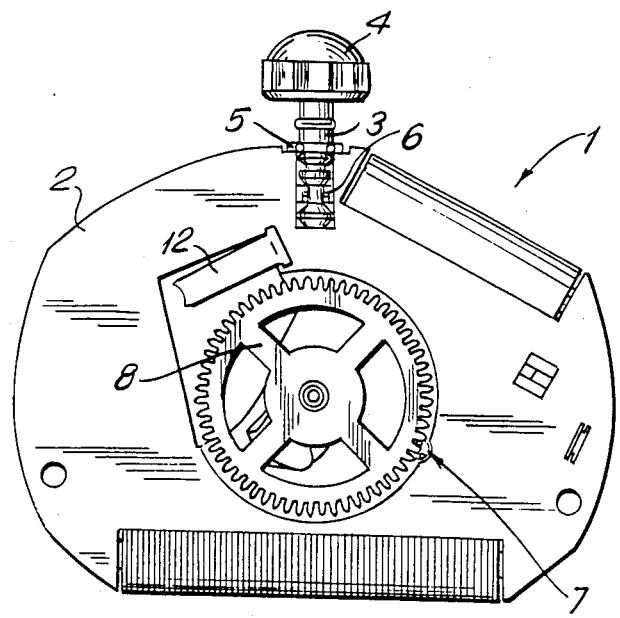

Referring now to FIG. 1 of the drawing, the wristwatch movement shown generally as 1 includes a nonmagnetic frame member, 2 preferably of plastic material, such as polycarbonate which may be precisely molded to define the various recesses and journals serving as bearings for the gear members, as well as being locally deformable upon application of heat to secure components to the frame plate. A stem 3 is manually actuatable by crown 4 with respect to a detent spring 5 to actuate electrical switch plate contacts, such as 6, to control the operation and setting of the wristwatch. As shown generally at reference number 7, a stepping motor rotor having two drive pins cooperating with 60 external teeth on a center wheel 8 is periodically stepped or rotated 180 degrees once per minute.

Figure 2:
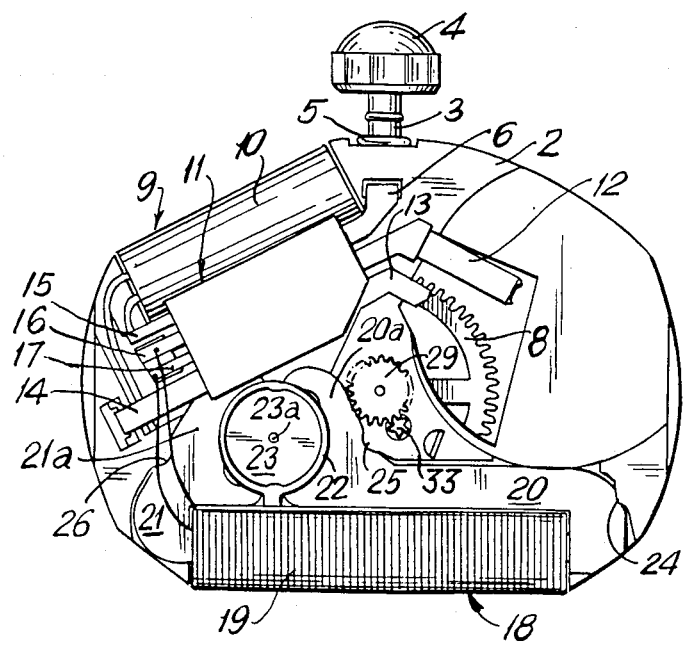

Referring to FIG. 2 of the drawing, the driving pulses are provided by a drive circuit assembly shown generally as 9, comprising a quartz crystal 10, and a integrated circuit (not shown) encapsulated within a monolithic plastic housing 11. The integrated circuit is connected to a lead frame having various conductive extensions such as battery terminals 12 and 13, quartz crystal attachment leads 14, 15 and coil connection leads 16, 17.

The stepping motor, shown generally as 18 comprises a coil 19 with leads connected to terminal 16, 17 of the drive circuit assembly. A first stator member 20 has a first pole shoe 20a and a second stator member 21 has a second pole shoe 21a. The pole shoes are positioned on either side of and abut a cylindrical wall member 22 of nonmagnetic material which is preferably integral with the frame plate 2. The wall member 22 holds a cap 23 of nonmagnetic material such as brass with a journal 23a for one end of the stepping motor rotor. The first and second stator members 20, 21 are disposed in a recess defined in the frame plate which locates them in place. The frame plate is deformed by heat during assembly at locations such as 24, 25, and 26 to hold the stator members 20, 21 in place as well as to force them abut the cylindrical wall 22.

Figure 3:
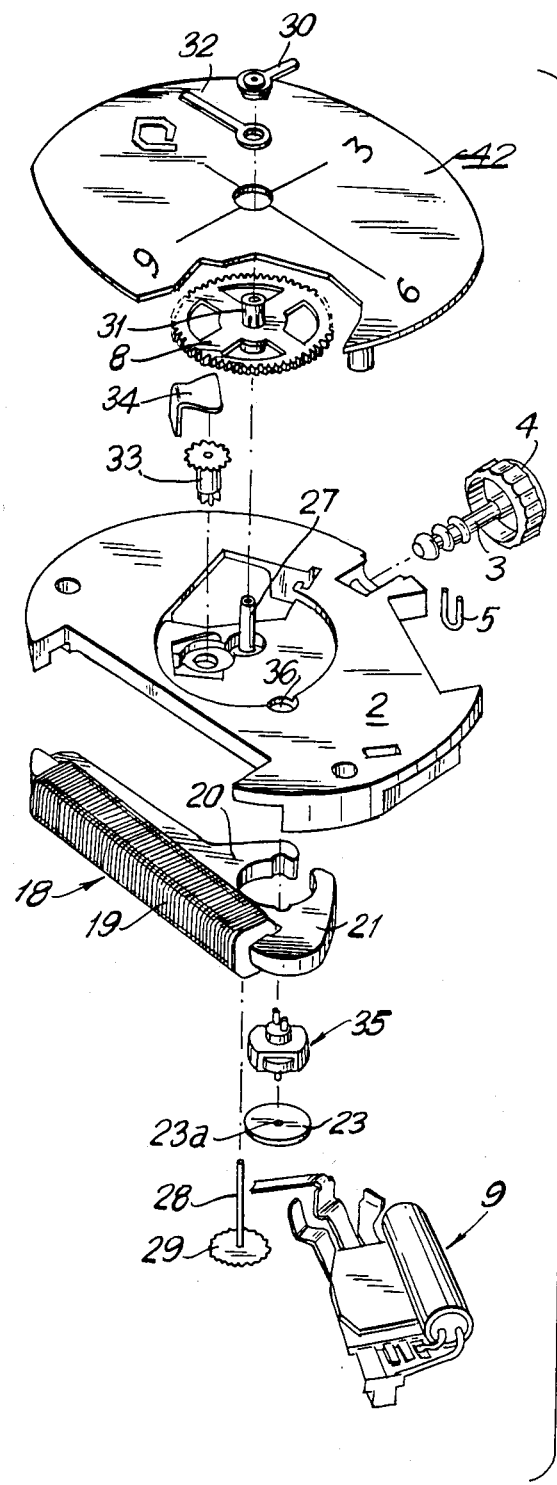

Referring now to FIG. 3 of the drawing, the exploded view shows parts having the reference numbers previously mentioned, as well as the following additional members, as follows. The frame plate 2 has fixed therein a metal center post 27 which internally journals an hour wheel shaft 28 with an hour wheel 29 fixed to its lower end. Shaft 28 is adapted to receive the hour hand 30 fixed to its upper end above a dial 42. The center post also serves to externally journal a center wheel pinion member 31 which is attached to center wheel 8 and adapted to receive a minute hand 32 on its upper end. Speed reduction between the minute hand and hour hand is provided by a reduction gear and pinion member 33 which is journaled in frame plate 2, and held in place by a metal cap 34. It remains to note that the stepping motor rotor, indicated by reference 35 is journaled at one end in a hole 36 molded in the frame plate 2 coaxial with wall 22, and journaled at its other end in the aforementioned hole 23a in the cap member 23.

Figure 4:
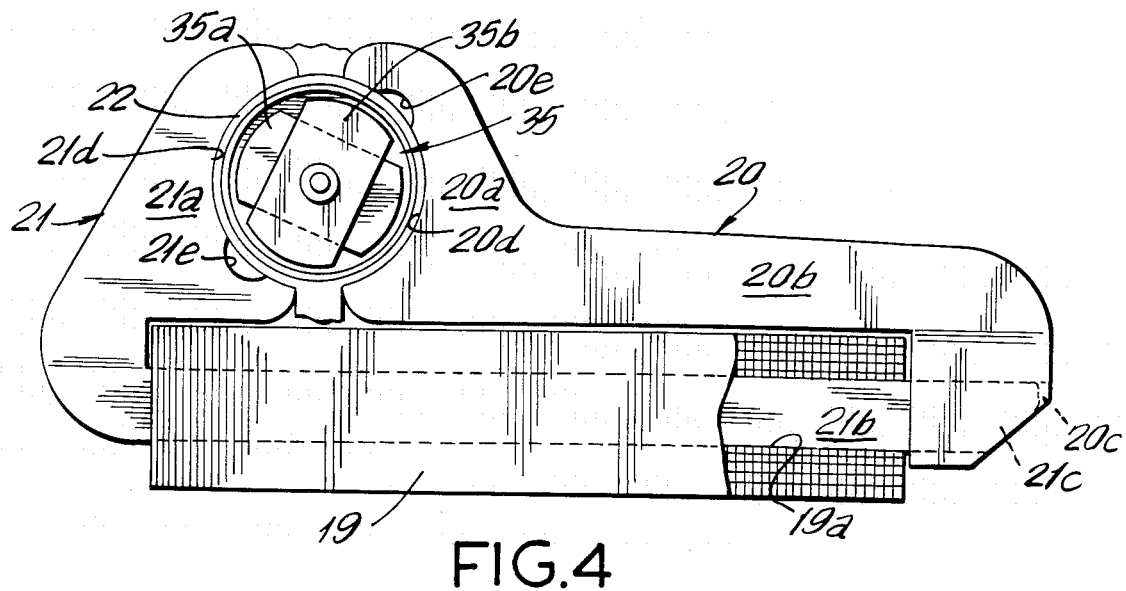

Referring now to FIG. 4 of the drawing, the stepping motor will be described in more detail. The first stator member 20 includes a stator portion 20b extending outside of the coil and terminating in an offset portion 20c at one end of coil 19. The second stator member 21 has connected to its pole shoe 21a an extending longitudinal core member 21b which passes through an opening 19a in the center of the coil. Core member 21b extends beyond the coil to terminate in a portion 21c overlapping stator portion 20c so as to be in magnetic circuit therewith.

The pole shoes 20a and 21a define arcuate pole faces 20d and 21d respectively. The pole faces, in turn, define opposed recess notches 20e, 21e respectively which serve to determine the rest position of rotor 35 in a manner known in the art. Rotor 35 comprises a permanent magnet portion 35a with a plastic overmolding portion 35b. The axis of rotor 35 is accurately positioned with respect to cylindrical wall 22 by means of journal hole 36 molded in frame plate 2 and journal 23a in the cap 23 (see FIG. 3). The pole shoe faces 20d, 21d are, in turn, accurately located with respect to the cylindrical wall 22, by abutting its outer surface.

Figure 5:
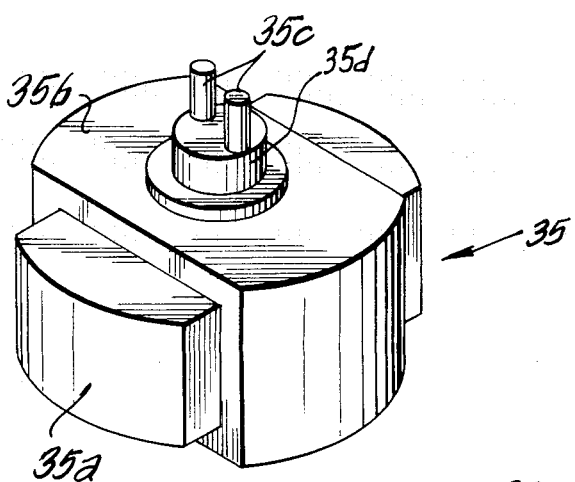

Referring now to FIG. 5 of the drawing, an enlarged perspective view is seen of the improved bipolar rotor which forms the subject of the present invention. The rotor 35 comprises a permanent magnet member 35a with a central part and a pair of magnetic north and south poles on opposite ends. Preferably the pole ends are arcuate as shown, although they could also be flat. The magnet member 35a has an axis of magnetization passing through the poles which is best seen in FIG. 6 of the drawing designated by line m-m which is symmetrical with respect to the axis of the magnet.

A plastic rotor body 35b is overmolded around the magnet at the time of production so as to completely surround the central part of the magnet member 35a. The rotor 35 includes an integral drive pinion portion for interacting with the toothed center wheel 8 (FIG. 6). In its preferred form, the drive pinion portion comprises a pair of parallel drive pins 35c. Preferably the opposed ends of the rotor body are arcuate as shown, although they could also be flat.

Figure 6:
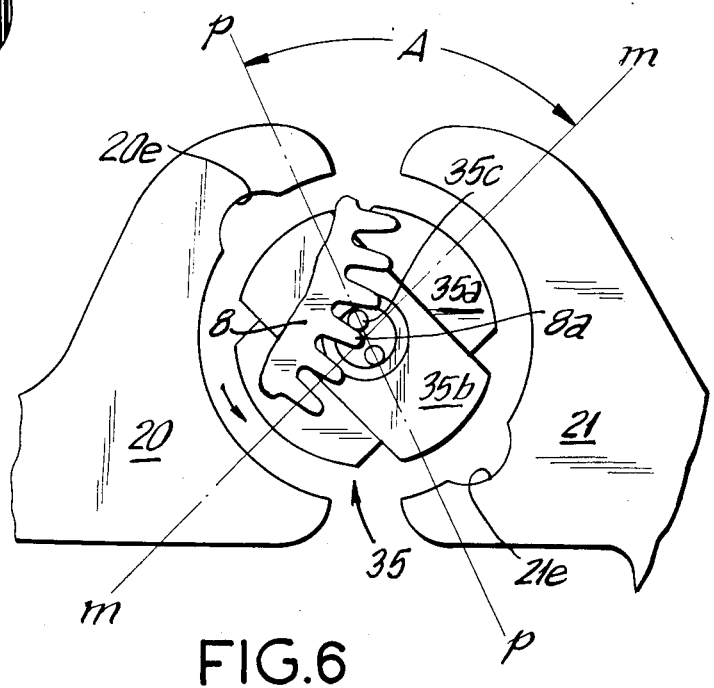

Referring to FIG. 6, when the permanent magnet member 35a is in its stable or rest position, as determined by the cutout notches 20e, 21e in the pole pieces, 20, 21, the preferred position of drive pins 35c is shown as having one of the drive pins engaging the flank of a tooth 8a of toothed wheel 8. When in this position, a line through both of the pins 35c is arbitrarily defined as an axis of engagement (p-p). An angle A is formed between the axis of magnetization and the axis of engagement which may be preselected as ideal for any particular design. Axis p-p is unlikely to lie along the axis of symmetry of the rotor body, which surrounds the central part of magnet 35a. However, the axes p-p and m-m may be fixed at a preselected angle with respect to one another at the moment of manufacture by virtue of the manufacturing process which forms the plastic material of the rotor around the central part of the magnet.

Various types of plastic material, such as polyimide 12 or equivalent are suitable for molding around a magnet member at the time of manufacture. The molding which includes the driving pins 35c also provides bearing journals, such as 35d above and below the magnet which mount the rotor in bearing holes, such as 23a, 36 for rotation. The magnet may be provided from several commercially available materials, such as samarium cobalt 5.

The method of manufacture consists of use of a cavity injection molding process. The cavity of the mold provides properly shaped cavities for the journal bearing surfaces on the rotor, and the two drive pins properly oriented at angle A. The permanent magnet is placed in the mold, and plastic material is injected around its central part and into the pin cavities. When the rotor is removed, the plastic material firmly secures the magnet at the proper orientation with respect to the drive pins.

While there has been described what is considered at present to be the preferred embodiment of the invention, other modifications will occur to those skilled in the art and it is desired to secure in the appended claims all such modifications as fall within the true spirit and scope of the invention.

I claim:

1. A bipolar rotor for a stepping motor comprising:
    a permanent magnet member having a central part and having a pair of magnetic poles on opposite ends of its major dimension, and having an axis of magnetization passing through said poles, said central portion having substantially flat sides, and
    a plastic rotor body molded around the central part of said magnet member to surround the central part of said magnet member, said rotor body defining an integral drive pinion, said drive pinion having a pair of opposed driving members with an axis of engagement passing therethrough, whereby said molded rotor body serves to fix said axis of engagement at a preselected angle with respect to said axis of magnetization.

2. The combination according to claim 1, whereby said rotor body further defines bearing journal portions on either side of said magnet central part.

3. A combination according to claim 1, wherein said rotor body defines opposed arcuate ends and whereby said magnet member defines opposed arcuate ends.

4. An improved bipolar rotor for a stepping motor having a rotor and a stator and adapted to drive a toothed wheel by periodically advancing said toothed wheel when the rotor turns 180 degrees, said improvement comprising:

a permanent magnet member having a central part and having a pair of magnetic poles on opposite ends of its major dimension, said central portion having substantially flat sides, said magnet member cooperating with said stator to define a stable rest position between steps, and a plastic overmolded rotor body formed around the central part of said magnet member to surround the central part of said magnet member, said overmolded rotor body defining an integral drive pinion having a pair of opposed drive pins, each one of which is adapted to alternately engage a toothed wheel when the permanent magnet member assumes said stable or rest position, whereby said overmolded rotor body serves to fix said pins at a preselected angle with respect to said permanent magnet.

* * * * *